US012695020B2

(12) United States Patent
Zhou et al.

(10) Patent No.: US 12,695,020 B2
(45) Date of Patent: Jul. 28, 2026

(54) INDUCTOR AND ELECTRONIC DEVICE

(71) Applicant: HUAWEI DIGITAL POWER TECHNOLOGIES CO., LTD., Shenzhen (CN)

(72) Inventors: He Zhou, Shanghai (CN); Yunyu Tang, Shanghai (CN); Lei Shi, Shanghai (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 955 days.

(21) Appl. No.: 17/955,031

(22) Filed: Sep. 28, 2022

(65) Prior Publication Data

US 2023/0014195 A1 Jan. 19, 2023

Related U.S. Application Data

(63) Continuation of application No. PCT/CN2021/078871, filed on Mar. 3, 2021.

(30) Foreign Application Priority Data

Mar. 30, 2020 (CN) ........................ 202010238999.9

(51) Int. Cl.
*H01F 27/22* (2006.01)
*H01F 27/08* (2006.01)
*H01F 27/10* (2006.01)

(52) U.S. Cl.
CPC ........... *H01F 27/22* (2013.01); *H01F 27/085* (2013.01); *H01F 27/10* (2013.01)

(58) Field of Classification Search
CPC ........ H01F 27/22; H01F 27/085; H01F 27/10; H01F 27/022; H01F 27/025; H01F 37/00;
(Continued)

(56) References Cited

U.S. PATENT DOCUMENTS 8,400,244 B2 * 3/2013 Sato ........................ H01F 27/22 336/60
2012/0139684 A1 * 6/2012 Kobayashi ............ H01F 27/306 336/92
(Continued)

FOREIGN PATENT DOCUMENTS

CN 201345269 Y 11/2009
CN 203982955 U 12/2014
(Continued)

OTHER PUBLICATIONS

Extended European Search Report in European Appln No. 21778919.7, dated Aug. 4, 2023, 15 pages.
(Continued)

*Primary Examiner* — Tuyen T Nguyen
(74) *Attorney, Agent, or Firm* — Fish & Richardson P.C.

(57) ABSTRACT

An inductor (100) is provided, and includes an inductor winding (10), a housing (20), and a thermally conductive packaging material (30). The inductor winding is disposed in the housing. The thermally conductive packaging material is potted in the housing to fill a gap between the inductor winding and the housing. The thermally conductive packaging material includes a first packaging layer (31) and a second packaging layer (32), and a coefficient of thermal conductivity of the first packaging layer is greater than a coefficient of thermal conductivity of the second packaging layer. The housing includes a heat dissipation wall (21) and a packaging wall (22), and the first packaging layer is closer to the heat dissipation wall than the second packaging layer. Heat generated by the inductor can be dissipated after being transmitted to each surface of the housing through the thermally conductive packaging material.

20 Claims, 5 Drawing Sheets

(58) Field of Classification Search
CPC ............... H01F 27/2876; H01F 17/045; H01F 27/2871; H01F 2017/046
USPC ........................................................ 336/55–62
See application file for complete search history.

(56) References Cited

U.S. PATENT DOCUMENTS

| | | | | |
|---|---|---|---|---|
| 2014/0232508 | A1* | 8/2014 | Inaba .................... | H01F 27/022 336/233 |
| 2014/0266527 | A1* | 9/2014 | Vafakhah ................ | H01F 27/06 336/65 |

FOREIGN PATENT DOCUMENTS

| | | | |
|---|---|---|---|
| CN | 206516688 | U | 9/2017 |
| CN | 206961630 | U | 2/2018 |
| CN | 108713232 | A | 10/2018 |
| CN | 208061843 | U | 11/2018 |
| CN | 208385129 | U | 1/2019 |
| CN | 104575951 | B | 6/2019 |
| CN | 110120292 | A | 8/2019 |
| CN | 110277224 | A | 9/2019 |
| CN | 111354547 | A | 6/2020 |
| DE | 19839458 | C2 | 1/2001 |
| EP | 3330983 | A1 | 6/2018 |
| JP | 6145717 | B2 | 6/2017 |
| WO | 2014034335 | A1 | 3/2014 |

OTHER PUBLICATIONS

Office Action in Chinese Appln. No. 202010238999.9, dated Oct. 28, 2020, 18 pages (with English translation).
International Search Report and Written Opinion in International Appln. No. PCT/CN2021/078871, mailed on Jun. 9, 2021, 18 pages (with English translation).

* cited by examiner

INDUCTOR AND ELECTRONIC DEVICE

CROSS-REFERENCE TO RELATED APPLICATIONS

This application is a continuation of International Application No. PCT/CN2021/078871, filed on Mar. 3, 2021, claims priority to Chinese Patent Application No. 202010238999.9, filed on Mar. 30, 2020. The disclosures of the aforementioned applications are hereby incorporated by reference in their entireties.

TECHNICAL FIELD

This application relates to the field of electrical components, and in particular, to an inductor and an electronic device.

BACKGROUND

An inductor is one of components commonly used in a circuit. The inductor generates a specific amount of heat in a working process. Especially for a power inductor, when a relatively high current flows through an inductor winding of the inductor, a relatively large amount of heat is generated. If the heat is accumulated near an inductor coil of the inductor winding for a long time and cannot be effectively dissipated, working stability of the inductor is affected. An existing inductor usually uses a potting process in which an inductor winding is disposed in a housing, a thermally conductive packaging material is potted inside, heat generated by the inductor winding is transferred to the housing through the thermally conductive packaging material, and then the heat is dissipated through the housing. In an existing solution, a same thermally conductive packaging material is usually injected into the housing. To achieve better heat dissipation effect, a thermally conductive packaging material with a relatively good heat-conducting property needs to be potted in the housing. The thermally conductive packaging material with a relatively good heat-conducting property is usually at relatively high costs, and consequently there are relatively high manufacturing costs for the inductor. In addition, a material with relatively high heat dissipation performance usually has relatively high density, resulting in a relatively great increase in an overall weight of a system.

SUMMARY

This application provides an inductor with relatively good heat dissipation effect, relatively low manufacturing costs, and a relatively light weight.

According to a first aspect, this application provides an inductor. The inductor includes an inductor winding, a housing, and a thermally conductive packaging material. The inductor winding is disposed in the housing. The thermally conductive packaging material is potted in the housing to fill a gap between the inductor winding and the housing. The thermally conductive packaging material includes a first packaging layer and a second packaging layer, and a coefficient of thermal conductivity of the first packaging layer is greater than a coefficient of thermal conductivity of the second packaging layer. The housing includes a heat dissipation wall and a packaging wall, and the first packaging layer is closer to the heat dissipation wall than the second packaging layer.

In this application, the housing includes the heat dissipation wall and the packaging wall, and the heat dissipation wall has better heat dissipation effect than the packaging wall. Therefore, most of heat generated by the inductor winding is dissipated through the heat dissipation wall, and less heat is dissipated through the packaging wall. A material whose coefficient of thermal conductivity is greater than that of the second packaging layer is used for the first packaging layer close to the heat dissipation wall with a relatively large heat dissipation coefficient, so that it can be ensured that most of the heat generated by the inductor winding can be quickly transmitted to the housing through the first packaging layer with good heat-conducting effect, to ensure relatively good heat dissipation for the inductor. In addition, a part of a region that is in the housing and that is far away from the heat dissipation wall is filled with the second packaging layer with relatively poor heat-conducting effect, to reduce costs and a weight of the thermally conductive packaging material, in other words, to reduce manufacturing costs and a weight of the inductor.

In an implementation, the inductor winding includes a magnetic core and an inductor coil wound around the magnetic core, and a gap between the inductor coil and the heat dissipation wall is filled with at least a part of the first packaging layer. A part that generates heat and that is of the inductor is mainly the inductor coil of the inductor winding. Therefore, the first packaging layer with relatively high heat dissipation efficiency is disposed between the inductor coil and the heat dissipation wall, so that the heat generated by the inductor winding can be directly transmitted to the heat dissipation wall through the first packaging layer with relatively high heat dissipation efficiency, to ensure that the inductor has relatively high heat dissipation efficiency.

In an implementation, the inductor winding includes a magnetic core and an inductor coil, the magnetic core includes a winding region, the inductor coil is wound around the winding region of the magnetic core, the first packaging layer includes a first packaging region and a second packaging region, the first packaging region is located between the inductor coil and the heat dissipation wall, the second packaging region is located between the winding region and the heat dissipation wall, and a coefficient of thermal conductivity of the first packaging region is greater than a coefficient of thermal conductivity of the second packaging region. Usually, a region in which the inductor winding generates heat is a position of the inductor coil, and usually no heat is generated at a position of the magnetic core. In this implementation, a thermally conductive packaging material whose coefficient of thermal conductivity is greater than that of the second packaging region corresponding to the position of the magnetic core is used for the first packaging region corresponding to the position of the inductor coil, so that the manufacturing costs and the weight of the inductor can be further reduced when it is met that the inductor has relatively good heat-conducting effect.

In an implementation, the first packaging region includes a first packaging sub-region and a second packaging sub-region, the inductor coil includes a first part and a second part, the first part is closer to the winding region than the second part, the first packaging sub-region is located between the first part and the heat dissipation wall, the second packaging sub-region is located between the second part and the heat dissipation wall, and a coefficient of thermal conductivity of the first packaging sub-region is greater than a coefficient of thermal conductivity of the second packaging sub-region. Usually, it is more difficult to dissipate heat of the first part that is of the inductor coil and that is close to the winding region of the magnetic core than that of the second part far away from the winding region of the magnetic core. In this implementation, a thermally conductive packaging material whose coefficient of thermal conductivity is greater than that of the second packaging sub-region located between the second part and the heat dissipation wall is used for the first packaging sub-region located between the first part and the heat dissipation wall, so that the manufacturing costs and the weight of the inductor can be further reduced when it is met that the inductor has relatively good heat-conducting effect.

In an implementation, a heat dissipation structure is disposed on the heat dissipation wall, and the heat dissipation structure is configured to dissipate heat, so that the heat dissipation wall has better heat dissipation effect than the packaging wall. Alternatively, a heat dissipation coefficient of the heat dissipation wall is greater than a heat dissipation coefficient of the packaging wall, so that the heat dissipation wall has better heat dissipation effect than the packaging wall.

In an implementation, the heat dissipation structure includes a plurality of heat dissipation fins disposed at intervals, and the plurality of heat dissipation fins are protruded on the heat dissipation wall. The heat dissipation fins are disposed on the heat dissipation wall, so that the heat dissipation wall can be improved, to improve heat dissipation efficiency.

In an implementation, the heat dissipation wall includes an inner surface facing the inside of the housing and an outer surface facing away from the inside of the housing, and the heat dissipation fins are protruded on the inner surface and/or the outer surface. The heat dissipation fins are protruded on the inner surface, so that a contact area between the heat dissipation wall and the thermally conductive packaging material can be increased, to improve efficiency of transmitting, to the heat dissipation wall, heat transmitted in the thermally conductive packaging material. The heat dissipation fins are protruded on the outer surface, so that a contact area for heat exchange between the heat dissipation wall and the outside can be increased, to improve heat dissipation efficiency of the heat dissipation wall, so as to improve heat dissipation efficiency of the inductor.

In an implementation, the heat dissipation structure includes an air cooling pipe, and the air cooling pipe is disposed on the heat dissipation wall, and is located on a side that is of the heat dissipation wall and that is far away from the inside of the housing. The air cooling pipe is disposed, so that efficiency of heat exchange between the heat dissipation wall and the outside can be improved, to improve the heat dissipation efficiency of the inductor.

The air cooling pipe includes an air intake vent and an air exhaust vent that are disposed opposite to each other, and a fan is disposed at the air intake vent, to increase a flow speed of cooling gas in the air cooling pipe and improve heat dissipation effect of the air cooling pipe.

In an implementation, the thermal conductive packing material includes one or more of thermally conductive silica gel, thermally conductive silicone grease, thermally conductive quartz sand, or a mixed thermally conductive material.

In an implementation, the housing is a metal housing, so that the housing can have relatively good heat dissipation effect. In an implementation, the metal housing can further shield external electromagnetic interference, so that the inductor has a better working environment. In an implementation, the housing is a metal aluminum housing.

In an implementation, the inductor coil is formed by winding a flat copper wire. When there is same efficiency of the inductor, there is a same size for the copper wire of the inductor coil. In comparison with a case in which a round copper wire is used, there is higher winding efficiency and a simpler manufacturing manner when the flat copper wire is used. In addition, the flat copper wire of the same size generates a smaller amount of heat than the copper wire, and therefore there is a reduction in heat generated by the inductor.

According to a second aspect, this application further provides an electronic device. The electronic device includes the foregoing inductor. The inductor has good heat dissipation effect, and therefore use of the electronic device including the inductor is not affected due to a heat dissipation problem of the inductor. In addition, the inductor in this application has relatively low manufacturing costs and a relatively light weight, and therefore the electronic device including the inductor has relatively low manufacturing costs and a lighter weight.

DESCRIPTION OF EMBODIMENTS

The implementations of this application are described below in detail with reference to the accompanying drawings in the implementations of this application.

This application provides an inductor. As a component commonly used in a circuit, the inductor can be used in devices such as an inverter and a transformer, and is configured to: convert electric energy into magnetic energy, store the magnetic energy, release the magnetic energy in an appropriate case, and convert the magnetic energy into electric energy, in other words, implement a function of electromagnetic conversion, implement a function of allowing a direct current to pass through and blocking an alternating current, or implement a function of avoiding an abrupt change in a current flowing through the inductor.

Figure 1:
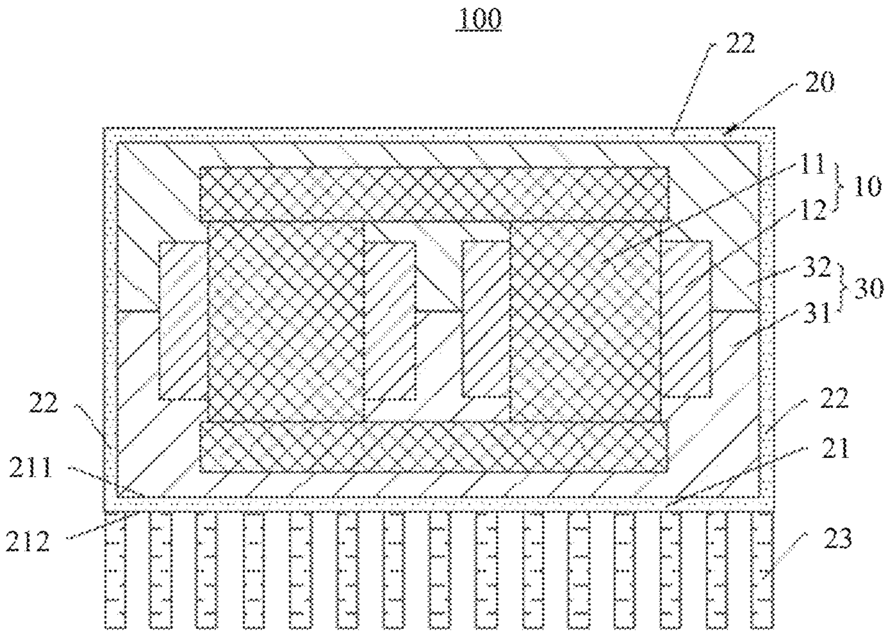
FIG. 1 is a cross-sectional schematic diagram of an inductor according to an implementation of this application.

FIG. 1 is a cross-sectional schematic diagram of an inductor 100 according to an implementation of this application. In this implementation, the inductor 100 includes an inductor winding 10, a housing 20, and a thermally conductive packaging material 30. The inductor winding 10 is disposed in the housing 20, and the thermally conductive packaging material 30 is potted in the housing 20 to fill a gap between the inductor winding 10 and the housing 20. Specifically, when the inductor 100 is manufactured, the inductor winding 10 is first disposed in the housing 20, and then the thermally conductive packaging material 30 is potted in the housing 20, so that the thermally conductive packaging material 30 fills the gap between the inductor winding 10 and the housing 20 and a gap in the inductor winding 10. The thermally conductive packaging material 30 is thermally conductive, and can transmit heat generated by the inductor winding 10 to each surface of the housing 20. After being transmitted to each surface of the housing 20, the heat is dissipated through the surface of the housing 20. Heat on each surface of the housing 20 may be dissipated in various cooling manners such as air cooling and water cooling, to implement heat dissipation for the inductor 100. Heat of the inductor 100 is transmitted to the housing 20, and then heat exchange is performed with the outside through the housing 20, to implement heat dissipation for the inductor 100. In this application, the thermally conductive packaging material 30 may be one or more of thermally conductive silica gel, thermally conductive silicone grease, thermally conductive quartz sand, or another type of thermally conductive material. Preferably, the thermally conductive packaging material 30 is thermally conductive silica gel, and the thermally conductive silica gel may solidify after being potted in the housing 20, to maintain stable positioning of the inductor winding 10 in the housing 20.

In this implementation, the thermally conductive packaging material 30 is potted in the housing 20 under a vacuum condition, or the thermally conductive packaging material 30 is potted in the housing 20 and then vacuum pumping is performed in the housing 20. In this way, air bubbles that may be generated when the thermally conductive packaging material 30 is potted in the housing 20 can be reduced or eliminated, to prevent the air bubbles from affecting heat-conducting effect of the thermally conductive packaging material 30.

Figure 2:
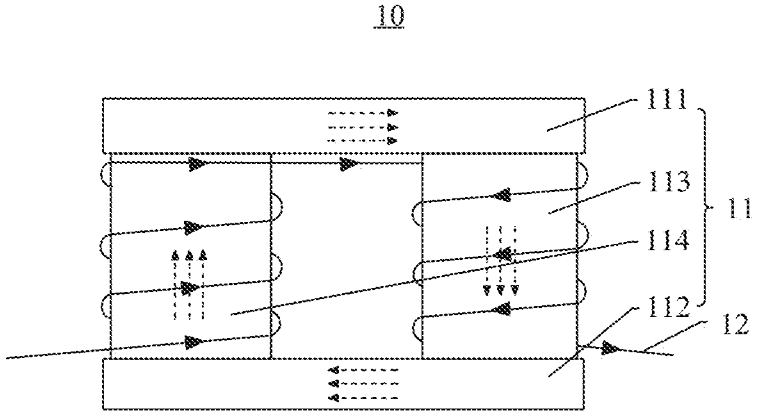
FIG. 2 is a schematic diagram of a principle of an inductor winding according to an implementation of this application.

FIG. 2 is a schematic diagram of a principle of the inductor winding 10. The inductor winding 10 is a main heat generation component in the inductor 100. The inductor 100 includes a magnetic core 11 and an inductor coil 12. The magnetic core 11 includes a winding region, and the inductor coil 12 is wound around the winding region of the magnetic core 11. In this implementation, the magnetic core 11 includes a first part 111 and a second part 112 that are disposed opposite to each other, and a third part 113 and a fourth part 114 that are connected between the first part 111 and the second part 112, and the third part 113 and the fourth part 114 are disposed opposite to each other. The coil is wound around the third part 113 and the fourth part 114. In other words, the third part 113 and the fourth part 114 of the magnetic core 11 in this implementation are winding regions. The coil on the magnetic core 11 is formed by winding a metal wire, and is used to transmit a current. In this implementation, the coil is obtained by winding a metal copper wire. When a direct current passes through the inductor coil 12, only a fixed magnetic line of force is present around the inductor coil 12, which does not change with time. However, when an alternating current passes through the inductor coil 12, the inductor coil 12 generates inductance to avoid a current change in an alternating current circuit. The magnetic core 11 is made of a magnetic material such as a magnetic powder core or a ferrite, and can bind a magnetic field more closely around an inductor element, to increase the inductance generated by the inductor coil 12. In this implementation, coils wound around the third part 113 and the fourth part 114 are head-to-tail connected, and the current can be transmitted through the coil wound around the third part 113 to the coil wound around the fourth part 114. In addition, a winding direction of the coil wound around the third part 113 is opposite to a winding direction of the coil wound around the fourth part 114, in other words, a flow direction of the current on the coil wound around the third part 113 is opposite to a flow direction of the current on the coil wound around the fourth part 114 (as shown by arrows on the coils in the figure), so that magnetic fluxes generated by the two coils can be added, to increase inductance of the inductor 100. A direction of a magnetic flux generated by the inductor 100 is shown by an arrow located on the magnetic core 11 in the figure.

Figure 3:
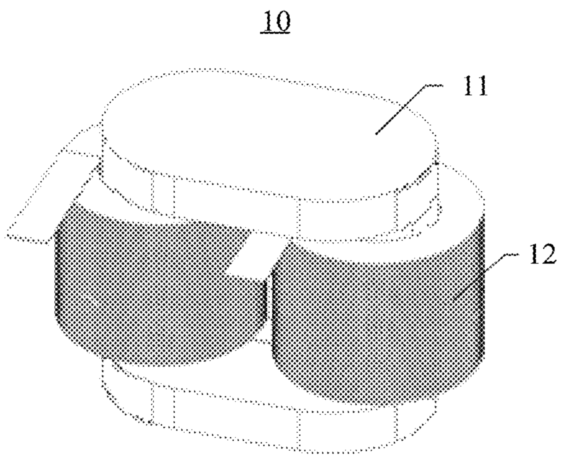
FIG. 3 is a schematic diagram of a structure of an inductor winding according to an implementation of this application.

A cross section of the metal wire wound to form the inductor coil 12 may be in various shapes, for example, may be a thin round metal wire or a flat metal wire. FIG. 3 is a schematic diagram of a structure of the inductor winding 10 according to an implementation of this application. In this implementation, the inductor coil 12 is formed by winding a flat copper wire. When there is same efficiency of the inductor 100, there is a same size for the copper wire of the inductor coil 12. In comparison with a case in which a round copper wire is used, there is higher winding efficiency and a simpler manufacturing manner when the flat copper wire is used. In addition, the flat copper wire of the same size generates a smaller amount of heat than the copper wire, and therefore there is a reduction in heat generated by the inductor 100.

Referring to FIG. 1 again, in an implementation, the housing 20 is made of a metal material. The metal material has a relatively good heat-conducting property and relatively high strength, can quickly dissipate heat, and can further achieve relatively good protection effect for the inductor winding 10 disposed in the metal material. In an implementation, the metal housing 20 further has an electromagnetic shielding function, and can shield external electromagnetic interference, so that the inductor 100 has a better working environment. In this implementation, the housing 20 is a metal aluminum housing. Metal aluminum has a relatively large coefficient of thermal conductivity, can quickly conduct heat, and therefore can effectively dissipate heat generated by the inductor 100.

The housing 20 includes a heat dissipation wall 21 and a packaging wall 22. The heat dissipation wall 21 and the packaging wall 22 form an accommodation cavity. Both the inductor winding 10 and the thermally conductive packaging material 30 are accommodated in the accommodation cavity of the housing 20. Specifically, in this implementation, the housing 20 is a cubic housing, and includes one heat dissipation wall 21 and five packaging walls 22. The heat dissipation wall 21 forms a bottom support of the inductor 100, and the heat dissipation wall 21 and the packaging walls 22 are connected to form a cubic housing. It may be understood that in another implementation of this application, there may be a plurality of heat dissipation walls 21, in other words, there may be two or more heat dissipation walls 21. Alternatively, in an implementation, the housing 20 may be a housing in various other shapes such as a cylindrical shape and a prismatic shape.

Figure 4:
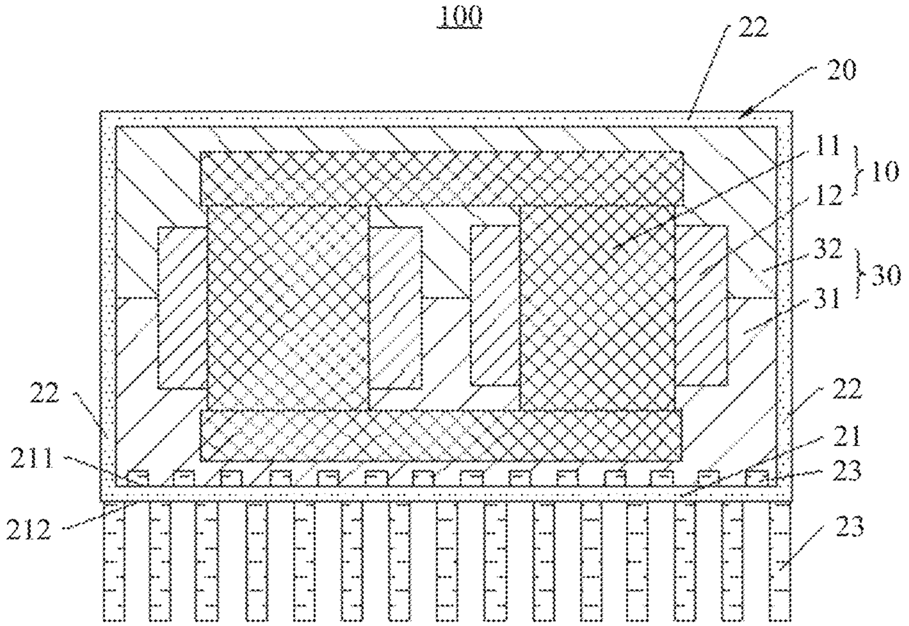
FIG. 4 is a cross-sectional schematic diagram of an inductor according to another implementation of this application.

The heat dissipation wall 21 has better heat dissipation effect than the packaging wall 22, and a larger amount of heat is dissipated through the heat dissipation wall 21 than through the packaging wall 22. In an implementation, most of heat dissipated by the inductor 100 is dissipated through the heat dissipation wall 21. In this implementation of this application, a heat dissipation structure is disposed on the heat dissipation wall 21, so that heat on the heat dissipation wall 21 can be dissipated as quickly as possible, and a larger amount of heat can be dissipated through the heat dissipation wall 21 than through the packaging wall 22. In this implementation, the heat dissipation structure is a plurality of heat dissipation fins 23 that are disposed at intervals and that are protruded on the heat dissipation wall 21. The heat dissipation fins 23 are disposed on the heat dissipation wall 21, so that a contact area for heat exchange between the heat dissipation wall 21 and the outside can be increased, to improve heat dissipation efficiency. Specifically, the heat dissipation wall 21 includes an inner surface 211 facing the inside of the housing 20 and an outer surface 212 facing away from the inside of the housing 20. The heat dissipation fins 23 are protruded on the inner surface 211 and/or the outer surface 212, in other words, the heat dissipation fins 23 may be protruded on the inner surface 211 or the outer surface 212, or the heat dissipation fins 23 are protruded on both the inner surface 211 and the outer surface 212. In this implementation, the heat dissipation fins 23 are protruded on the outer surface 212, so that a contact area for heat exchange between the heat dissipation wall 21 and the outside can be increased, to improve heat dissipation efficiency of the housing 20, so as to improve heat dissipation efficiency of the inductor 100. FIG. 4 is a cross-sectional schematic diagram of an inductor 100 according to another implementation of this application. In this implementation, the heat dissipation fins 23 are protruded on both the inner surface 211 and the outer surface 212 of the heat dissipation wall 21. The heat dissipation fins 23 are protruded on the inner surface 211, so that a contact area between the heat dissipation wall 21 and the thermally conductive packaging material 30 can be increased, to improve efficiency of transmitting heat transmitted in the thermally conductive packaging material 30 to the heat dissipation wall 21. The heat dissipation fins 23 are protruded on the outer surface 212, so that a contact area for heat exchange between the heat dissipation wall 21 and the outside is increased, to improve heat dissipation efficiency of the heat dissipation wall 21, so as to improve heat dissipation efficiency of the inductor 100. Therefore, in this implementation, the heat dissipation fins 23 can quickly transmit and dissipate the heat generated by the inductor winding 10, to improve the heat dissipation efficiency of the inductor 100.

It may be understood that in an implementation, either or each of the inner surface 211 and the outer surface 212 of the heat dissipation wall 21 may be an uneven surface, for example, a sawtooth surface or a wavy surface. The inner surface 211 of the heat dissipation wall 21 is an uneven surface, so that the contact area between the heat dissipation wall 21 and the thermally conductive packaging material 30 can be increased, and the heat transmitted in the thermally conductive packaging material 30 is quickly transmitted to the heat dissipation wall 21. The outer surface 212 of the heat dissipation wall 21 is an uneven surface, so that the contact area for heat exchange between the heat dissipation wall 21 and the outside can be increased, to ensure that heat transmitted to the heat dissipation wall 21 is quickly dissipated.

In another implementation of this application, the heat dissipation wall 21 of the housing 20 may be made of a material whose heat dissipation coefficient is greater than that of the packaging wall 22, so that the heat dissipation wall 21 has better heat dissipation effect than the packaging wall 22, and a larger amount of heat is dissipated through the heat dissipation wall 21 than through the packaging wall 22.

Figure 5:
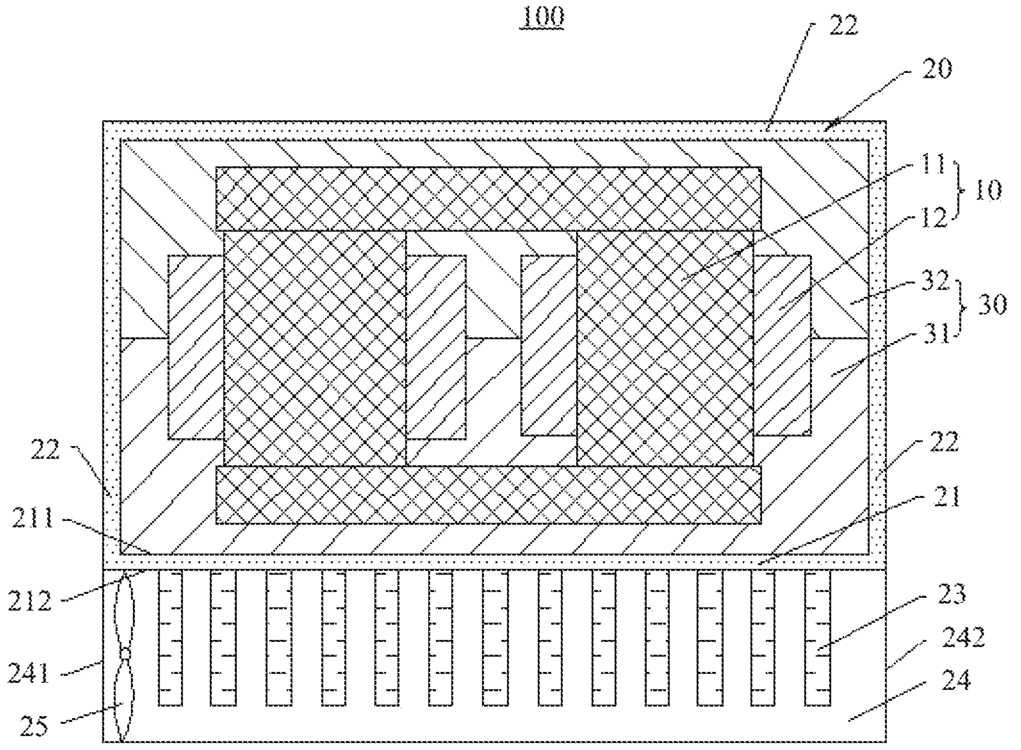
FIG. 5 is a cross-sectional schematic diagram of an inductor according to another implementation of this application.

FIG. 5 is a cross-sectional schematic diagram of an inductor 100 according to another implementation of this application. A difference between the inductor 100 in this implementation and the inductor 100 shown in FIG. 1 lies in that the heat dissipation structure further includes an air cooling pipe 24, and the air cooling pipe 24 is disposed on the outer surface 212 of the heat dissipation wall 21. In an optional implementation, the air cooling pipe 24 is disposed as a tubular structure, and includes an air intake vent 241 and an air exhaust vent 242 that are disposed opposite to each other. Cooling air enters through the air intake vent 241, flows through the air cooling pipe 24, performs heat exchange with the heat dissipation wall 21, and then exits through the air exhaust vent 242. In an implementation, a fan 25 is disposed at the air intake vent 241, to improve flow efficiency of air in the air cooling pipe 24, so that efficiency of performing heat exchange between the air in the air cooling pipe 24 and the heat dissipation wall 21 is improved, to improve the heat dissipation efficiency of the inductor 100. In an implementation, a negative pressure fan is disposed at the air exhaust vent 242, and is configured to quickly draw out the air in the air cooling pipe 24, to further promote flow of the air in the air cooling pipe 24. In this implementation, the heat dissipation fins 23 protruded on the heat dissipation wall 21 are located in the air cooling pipe 24. The heat dissipation fins 23 are used to increase a contact area between the heat dissipation wall 21 and the air in the air cooling pipe 24, to improve the heat dissipation efficiency of the inductor 100. There is a gap between the heat dissipation fins 23 and an inner wall of the air cooling pipe 24. Alternatively, in an implementation, a hole is disposed on the heat dissipation fin 23, to ensure that the air in the air cooling pipe 24 can flow more quickly. It may be understood that in another implementation of this application, the heat dissipation structure may include only the air cooling pipe 24 but no heat dissipation fins 23. Alternatively, in an implementation, the air cooling pipe 24 may be replaced with a water cooling pipe. The water cooling pipe includes a water inlet and a water outlet that are disposed to each other. Cooling liquid flows in from the water inlet of the water cooling pipe, flows through the water cooling pipe, performs heat exchange with the heat dissipation wall 21, and then flows out from the water outlet, to improve the heat dissipation efficiency of the heat dissipation wall 21.

Referring to FIG. 1 again, in this implementation, the thermally conductive packaging material 30 includes a first packaging layer 31 and a second packaging layer 32. A coefficient of thermal conductivity of the first packaging layer 31 is greater than a coefficient of thermal conductivity of the second packaging layer 32. The first packaging layer 31 is closer to the heat dissipation wall 21 than the second packaging layer 32. Usually, a larger heat dissipation coefficient of the thermally conductive packaging material 30 indicates higher costs of the thermally conductive packaging material 30 and a heavier weight. For example, thermally conductive silica gel is a type of silica gel formed after a specific conductive filler is added based on silicone rubber. For the thermally conductive packaging material 30 of a thermally conductive silica gel type, a conductive filler added to common thermally conductive silica gel is aluminum trioxide or the like, and a conductive filler added to highly thermally conductive silica gel is a thermally conductive material such as boron nitride. The highly thermally conductive silica gel has higher manufacturing costs than the common thermally conductive silica gel, and has a heavier weight than the common thermally conductive silica gel. In this application, the housing 20 includes the heat dissipation wall 21 and the packaging wall 22, and the heat dissipation wall 21 has better heat dissipation effect than the packaging wall 22. Therefore, most of heat generated by the inductor winding 10 is dissipated through the heat dissipation wall 21, and less heat is dissipated through the packaging wall 22. A material whose coefficient of thermal conductivity is greater than that of the second packaging layer 32 is used for the first packaging layer 31 close to the heat dissipation wall 21 with a relatively large heat dissipation coefficient, so that it can be ensured that most of the heat generated by the inductor winding 10 can be quickly transmitted to the housing through the first packaging layer 31 with good heat-conducting effect, to ensure relatively good heat dissipation for the inductor 100. In addition, a part of a region that is in the housing 20 and that is far away from the heat dissipation wall 21 is filled with the second packaging layer 32 with relatively poor heat-conducting effect, to reduce costs and a weight of the thermally conductive packaging material 30, in other words, to reduce manufacturing costs and a weight of the inductor 100. It may be understood that in another implementation of this application, the thermally conductive packaging material 30 may further include more packaging layers, for example, may further include a third packaging layer and a fourth packaging layer. Different packaging layers may have different coefficients of thermal conductivity, so that the costs and the weight of the thermally conductive packaging material 30 are reduced when it is met that the inductor 100 has relatively good heat-conducting effect.

In an implementation, a gap between the inductor coil 12 and the heat dissipation wall 21 is filled with at least a part of the first packaging layer 31. The gap between the inductor coil 12 and the heat dissipation wall 21 refers to space between a surface that is of the inductor coil 12 and that is closest to the heat dissipation wall 21 and the heat dissipation wall 21. A part that generates heat and that is of the inductor 100 is mainly the inductor coil 12 of the inductor winding 10. Therefore, the first packaging layer 31 is disposed between the inductor coil 12 and the heat dissipation wall 21, so that the heat generated by the inductor winding 10 can be directly transmitted to the heat dissipation wall 21 through the first packaging layer 31. The first packaging layer 31 has relatively high heat dissipation efficiency, and therefore the heat generated by the inductor winding 10 can be efficiently transmitted to the housing 20, to ensure that the inductor 100 can have relatively high heat dissipation efficiency.

Figure 6:
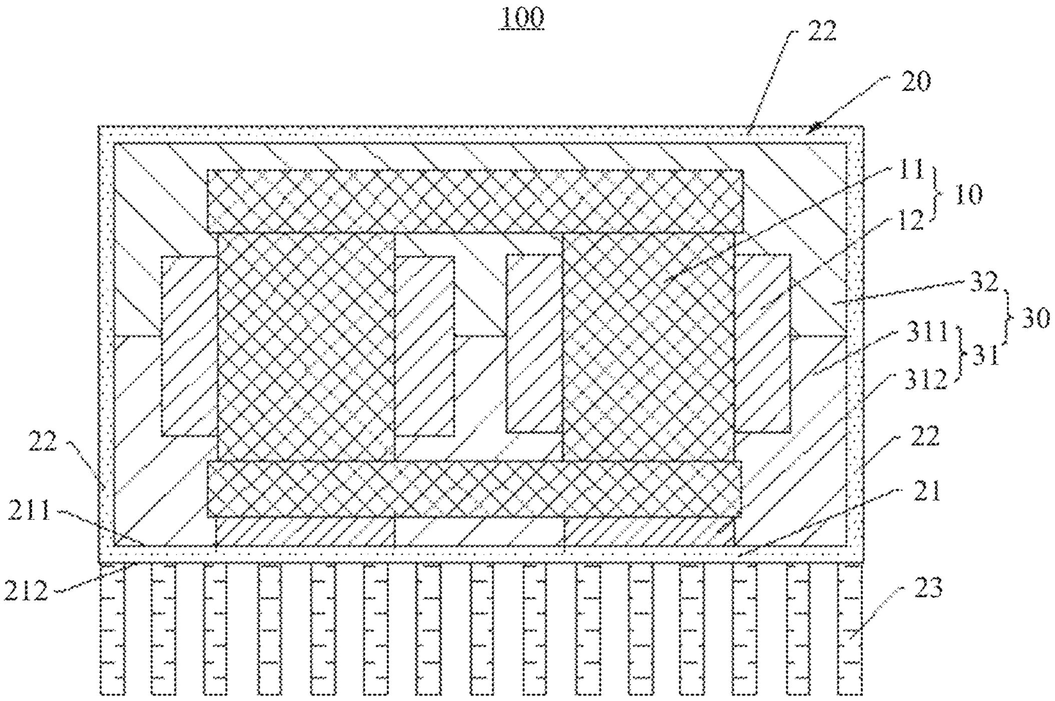
FIG. 6 is a cross-sectional schematic diagram of an inductor according to another implementation of this application.

In the inductor 100 in an implementation, the coil 12 of the inductor winding 10 is a structure that mainly generates heat, and the magnetic core 11 generates less heat. Therefore, a thermally conductive packaging material at a corresponding position of the coil 11 may have a larger coefficient of thermal conductivity than a thermally conductive packaging material at a corresponding position of the magnetic core 12, so that the manufacturing costs of the inductor 100 and the weight of the inductor 100 are further reduced when the heat generated by the inductor winding 10 is dissipated as quickly as possible. For example, FIG. 6 is a cross-sectional schematic diagram of an inductor 100 according to another implementation of this application. A difference between this implementation and the implementation shown in FIG. 1 lies in that the first packaging layer 31 includes a first packaging region 311 and a second packaging region 312. The first packaging region 311 is located between the inductor coil 12 and the heat dissipation wall 21. The second packaging region 312 is located between the winding region of the magnetic core 11 and the heat dissipation wall 21. In other words, an orthographic projection of the first packaging region 311 on the heat dissipation wall 21 covers an orthographic projection of the inductor coil 12 on the heat dissipation wall 21, and an orthographic projection of the second packaging region 312 on the heat dissipation wall 21 covers an orthographic projection of the winding region of the magnetic core 11 on the heat dissipation wall 21. In this implementation, a coefficient of thermal conductivity of the first packaging region 311 is greater than a coefficient of thermal conductivity of the second packaging region 312, in other words, a thermally conductive packaging material 30 whose coefficient of thermal conductivity is less than that of a thermally conductive packaging material 30 of the second packaging region 311 may be used for the second packaging region 312. In this implementation, a thermally conductive packaging material 30 whose coefficient of thermal conductivity is greater than that of the second packaging region 312 corresponding to the position of the magnetic core 11 is used for the first packaging region 311 corresponding to the position of the inductor coil 12, in other words, different thermally conductive packaging materials 30 are correspondingly used for different corresponding positions of the inductor winding 10, so that the manufacturing costs and the weight of the inductor 100 can be further reduced when it is met that the inductor 100 has relatively good heat-conducting effect.

It may be understood that in the inductor 100 in another implementation of this application, the magnetic core 11 of the inductor winding 10 generates more heat than the coil 11. In this implementation, the coefficient of thermal conductivity of the thermally conductive packaging material at the corresponding position of the coil 11 is less than the coefficient of thermal conductivity of the thermally conductive packaging material at the corresponding position of the magnetic core 12, so that the manufacturing costs of the inductor 100 and the weight of the inductor 100 can be further reduced when the heat generated by the inductor winding 10 is dissipated as quickly as possible.

Figure 7:
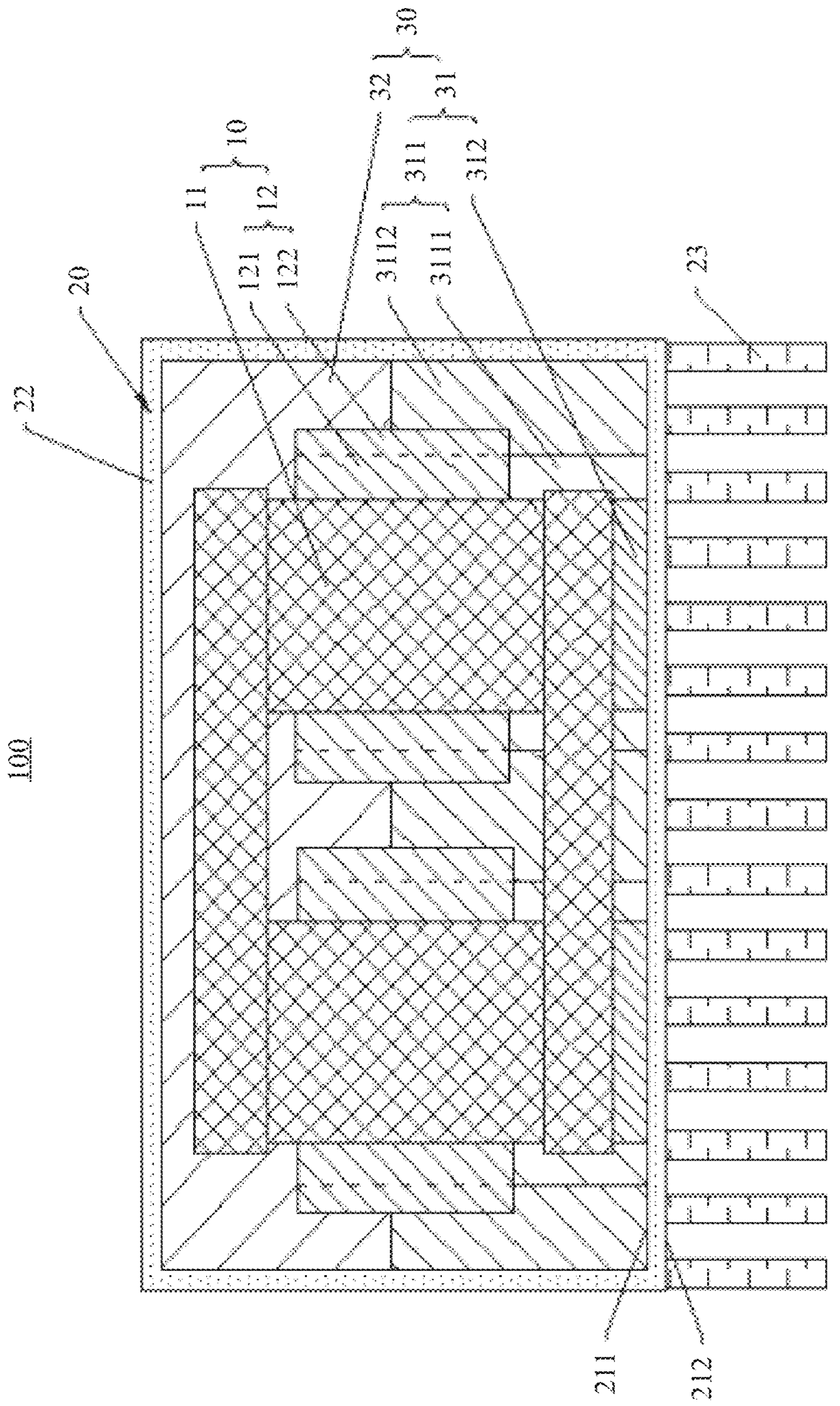
FIG. 7 is a cross-sectional schematic diagram of an inductor according to another implementation of this application.

FIG. 7 is a schematic diagram of a structure of an inductor 100 according to another implementation of this application. A difference between this implementation and the implementation shown in FIG. 6 lies in that the first packaging region 311 includes a first packaging sub-region 3111 and a second packaging sub-region 3112. A coefficient of thermal conductivity of the first packaging sub-region 3111 is greater than a coefficient of thermal conductivity of the second packaging sub-region 3112, in other words, a coefficient of thermal conductivity of a thermally conductive packaging material 30 used for the second packaging sub-region 3112 is less than a coefficient of thermal conductivity of a thermally conductive packaging material 30 used for the first packaging sub-region 3111. The inductor coil 12 includes a first part 121 and a second part 122, and the first part 121 is closer to the winding region of the magnetic core 11 than the second part 122. It should be noted that the first part 121 and the second part 122 are two parts that are obtained through division for ease of description, but are not two structures that actually exist. The first packaging sub-region 3111 is located between the first part 121 and the heat dissipation wall 21, and the second packaging sub-region 3112 is located between the second part 122 and the heat dissipation wall 21. Usually, it is more difficult to dissipate heat of the first part 121 that is of the inductor coil 12 and that is close to the winding region of the magnetic core 11 than that of the second part 122 far away from the winding region of the magnetic core 11. In this implementation, a thermally conductive packaging material whose coefficient of thermal conductivity is greater than that of the second packaging sub-region 3112 located between the second part 122 and the heat dissipation wall 21 is used for the first packaging sub-region 3111 located between the first part 121 and the heat dissipation wall 21. In this way, when heat at all positions of the inductor coil 12 can be relatively quickly dissipated, a same thermally conductive packaging material

30 with a large coefficient of thermal conductivity does not need to be used at all the positions, so that the manufacturing costs and the weight of the inductor 100 can be further reduced when it is met that the inductor 100 has relatively good heat-conducting effect.

In this application, thermally conductive packaging materials 30 with different coefficients of thermal conductivity are potted at different positions in the housing 20, so that the heat generated by the inductor winding 10 in the housing 20 can be quickly transmitted to the housing 20, to ensure that when the inductor 100 can efficiently dissipate heat, the costs and the weight of the thermally conductive packaging material 30 are reduced, and the manufacturing costs and the weight of the inductor 100 are reduced.

This application further provides an electronic device. The electronic device includes an inductor 100. Specifically, the electronic device may be an electronic device such as an inverter or a transformer. The inductor has good heat dissipation effect, and therefore use of the electronic device including the inductor is not affected due to a heat dissipation problem of the inductor. In addition, the inductor in this application has relatively low manufacturing costs and a relatively light weight, and therefore the electronic device including the inductor has relatively low manufacturing costs and a lighter weight.

It should be noted that the foregoing descriptions are merely specific implementations of this application, but the protection scope of this application is not limited thereto. Any variation or replacement readily figured out by a person skilled in the art within the technical scope disclosed in this application shall fall within the protection scope of this application. If no conflict occurs, the implementations of this application and the features in the implementations may be combined with each other. Therefore, the protection scope of this application shall be subject to the protection scope of the claims.

What is claimed is:

1. An inductor comprising:

an inductor winding;

a housing; and a thermally conductive packaging material, wherein the inductor winding is disposed in the housing, the thermally conductive packaging material is potted in the housing to fill a gap between the inductor winding and the housing, the thermally conductive packaging material comprises a first packaging layer and a second packaging layer, and a coefficient of thermal conductivity of the first packaging layer is greater than a coefficient of thermal conductivity of the second packaging layer, and the housing comprises a heat dissipation wall and a packaging wall, and a first heat dissipation coefficient of the heat dissipation wall to which the first packaging layer is closer than the second packaging layer is greater than a second heat dissipation coefficient of the packaging wall.

2. The inductor according to claim 1, wherein the inductor winding comprises a magnetic core and an inductor coil wound around the magnetic core, and a gap between the inductor coil and the heat dissipation wall is filled with at least a part of the first packaging layer.

3. The inductor according to claim 1, wherein the inductor winding comprises a magnetic core and an inductor coil, the magnetic core comprises a winding region, the inductor coil is wound around the winding region of the magnetic core, the first packaging layer includes a first packaging region and a second packaging region, the first packaging region is located between the inductor coil and the heat dissipation wall, the second packaging region is located between the winding region and the heat dissipation wall, and a coefficient of thermal conductivity of the first packaging region is greater than a coefficient of thermal conductivity of the second packaging region.

4. The inductor according to claim 3, wherein the first packaging region comprises a first packaging sub-region and a second packaging sub-region, the inductor coil comprises a first part and a second part, the first part is closer to the winding region than the second part, the first packaging sub-region is located between the first part and the heat dissipation wall, the second packaging sub-region is located between the second part and the heat dissipation wall, and a coefficient of thermal conductivity of the first packaging sub-region is greater than a coefficient of thermal conductivity of the second packaging sub-region.

5. The inductor according to claim 1, wherein:

a heat dissipation structure is disposed on the heat dissipation wall that has the first heat dissipation coefficient greater than the second heat dissipation coefficient of the packaging wall, and the heat dissipation structure is configured to dissipate heat.

6. The inductor according to claim 5, wherein the heat dissipation structure comprises a plurality of heat dissipation fins disposed at intervals, the heat dissipation wall comprises an inner surface facing the inside of the housing and an outer surface facing away from the inside of the housing, and the heat dissipation fins protrude from at least one of the inner surface or the outer surface.

7. The inductor according to claim 5, wherein the heat dissipation structure comprises an air cooling pipe, and the air cooling pipe is disposed on the heat dissipation wall, and is located on a side of the heat dissipation wall that is far away from the inside of the housing.

8. The inductor according to claim 7, wherein the air cooling pipe includes an air intake vent and an air exhaust vent that are disposed opposite to each other, and a fan is disposed at the air intake vent.

9. The inductor according to claim 1, wherein the thermally conductive packaging material comprises one or more of thermally conductive silica gel, thermally conductive silicone grease, thermally conductive quartz sand, or a mixed thermally conductive material.

10. The inductor according to claim 3, wherein the inductor coil comprises a wound copper wire.

11. An inductor, comprising:

a housing comprising a heat dissipation wall and a packaging wall;

an inductor winding disposed in the housing;

a thermally conductive packaging material potted in the housing to fill a gap between the inductor winding and the housing; and wherein the thermally conductive packaging material comprises a first packaging layer and a second packaging layer, and a coefficient of thermal conductivity of the first packaging layer is greater than a coefficient of thermal conductivity of the second packaging layer, and a first heat dissipation coefficient of the heat dissipation wall to which the first packaging layer is closer than the second packaging layer is greater than a second heat dissipation coefficient of the packaging wall.

12. The inductor according to claim 11, wherein the inductor winding comprises a magnetic core and an inductor coil wound around the magnetic core, and a gap between the inductor coil and the heat dissipation wall is filled with at least a part of the first packaging layer.

13. The inductor according to claim 11, wherein the inductor winding comprises a magnetic core and an inductor coil, the magnetic core comprises a winding region, the inductor coil is wound around the winding region of the magnetic core, the first packaging layer includes a first packaging region and a second packaging region, the first packaging region is located between the inductor coil and the heat dissipation wall, the second packaging region is located between the winding region and the heat dissipation wall, and a coefficient of thermal conductivity of the first packaging region is greater than a coefficient of thermal conductivity of the second packaging region.

14. The inductor according to claim 13, wherein the first packaging region comprises a first packaging sub-region and a second packaging sub-region, the inductor coil comprises a first part and a second part, the first part is closer to the winding region than the second part, the first packaging sub-region is located between the first part and the heat dissipation wall, the second packaging sub-region is located between the second part and the heat dissipation wall, and a coefficient of thermal conductivity of the first packaging sub-region is greater than a coefficient of thermal conductivity of the second packaging sub-region.

15. The inductor according to claim 11, wherein:

a heat dissipation structure is disposed on the heat dissipation wall that has the first heat dissipation coefficient greater than the second heat dissipation coefficient of the packaging wall, and the heat dissipation structure is configured to dissipate heat.

16. The inductor according to claim 15, wherein the heat dissipation structure comprises a plurality of heat dissipation fins disposed at intervals, the heat dissipation wall comprises an inner surface facing the inside of the housing and an outer surface facing away from the inside of the housing, and the heat dissipation fins protrude from at least one of the inner surface or the outer surface.

17. The inductor according to claim 15, wherein the heat dissipation structure comprises an air cooling pipe, and the air cooling pipe is disposed on the heat dissipation wall, and is located on a side of the heat dissipation wall that is far away from the inside of the housing.

18. The inductor according to claim 17, wherein the air cooling pipe includes an air intake vent and an air exhaust vent that are disposed opposite to each other, and a fan is disposed at the air intake vent.

19. The inductor according to claim 11, wherein the thermally conductive packaging material comprises one or more of thermally conductive silica gel, thermally conductive silicone grease, thermally conductive quartz sand, or a mixed thermally conductive material.

20. The inductor according to claim 13, wherein the inductor coil comprises a wound copper wire.

* * * * *